United States Patent [19]

Schiller et al.

[11] 4,342,652

[45] Aug. 3, 1982

[54] PROCESS FOR SCALE INHIBITION IN EVAPORATIVE DESALINATION UNITS

[75] Inventors: Arthur M. Schiller; James S. Balcerski, both of Stamford, Conn.

[73] Assignee: American Cyanamid Company, Stamford, Conn.

[21] Appl. No.: 227,287

[22] Filed: Jan. 22, 1981

Related U.S. Application Data

[63] Continuation of Ser. No. 945,661, Sep. 25, 1978, abandoned.

[51] Int. Cl.$^3$ ............................................. C02F 5/10
[52] U.S. Cl. ...................................... 210/698; 203/7; 252/180
[58] Field of Search ................... 203/7; 210/698, 701; 252/180, 181

[56] References Cited

U.S. PATENT DOCUMENTS

| | | | |
|---|---|---|---|
| 3,706,717 | 12/1972 | Siegele | 252/180 |
| 3,879,288 | 4/1975 | Siegele | 252/180 |
| 4,001,134 | 1/1977 | Markofsky et al. | 210/698 |
| 4,166,041 | 8/1979 | Goodman | 210/698 |
| 4,253,968 | 3/1981 | Eastman | 210/698 |

*Primary Examiner*—Peter A. Hruskoci
*Attorney, Agent, or Firm*—Michael J. Kelly; Paul W. Leuzzi, II

[57] ABSTRACT

An effective amount of a copolymer of maleic acid or anhydride and allyl sulfonic acid when added to the water to be treated provides increased inhibition of scale formation in evaporative desalination units.

2 Claims, No Drawings

PROCESS FOR SCALE INHIBITION IN EVAPORATIVE DESALINATION UNITS

This is a continuation, of application Ser. No. 945,661, filed Sept. 25, 1978, now abandoned.

This invention relates to a process for reducing scaling associated with evaporative desalination units. More particularly, this invention relates to such a process wherein an effective amount of a copolymer of maleic acid and allyl sulfonic acid added to the saline water being processed reduces scaling due to calcium carbonate as well as to magnesium hydroxide.

Desalination is a process for removing soluble salts from water containing them to render such water potable or useful in operations where the original dissolved salt content is unacceptable. Desalination is an important process for providing potable water from sea water in arid areas where other sources of water are limited. Desalination is also an important process for removing salts from waste waters so that such waters can be recycled to processing or safely discharged into natural waters.

Desalination may be an evaporative process carried out in desalination units that may be operated under vacuum, at atmospheric pressure, or at superatmospheric pressure. The use of vacuum or superatmospheric pressures is more difficult and costly to employ in conjunction with desalination units and, accordingly, the preferred procedure of operation is essentially at atmospheric pressure. In operating such desalination units, the temperature of operation, which is dependent upon the operating pressure employed, influences the nature of scaling that occurs. At atmospheric pressure, a transition point occurs at a temperature between about 80° C. and about 90° C., below which the scale formation is due to calcium carbonate and above which the scale formation is due to magnesium hydroxide. While scale formation due to calcium carbonate can be controlled by a number of useful additives, the problem of magnesium hydroxide scale or sludge control in evaporation desalination units has not been satisfactorily solved. Thus, although evaporative desalination units are potentially efficient in the desalination of sea waters and waters of high salt contents, the rapid formation of magnesium scaling or sludging reduces efficiency, necessitating shut-down and scale or sludge removal from the desalination units. The loss of operating time and the difficulties of scale or sludge removal severely limit the amount of water processed by a desalination unit in a given time period and add to the cost of processed water.

A number of methods have previously been proposed for decreasing deposition of scale from sea water onto metal surfaces and involve the use of certain chelating agents. One such method involves addition of polyphosphate-ligno-sulfonate mixtures, such as described in U.S. Pat. No. 2,782,162 to Lidell. However, these mixtures are not effective in saline waters at high temperatures and result in calcium phosphate sludge.

Also, certain polyelectrolytes, such as sodium polyacrylate, are effective in preventing calcium carbonate scale at high temperatures, see South African patent Application No. 680,947, but exhibit low effectiveness against magnesium scales.

U.S. Pat. No. 3,981,779 to Block teaches use of a chelate surfactant selected from N-lauryliminodiacetic acid, N-oleyliminodiacetic acid, oleoyliminodiacetic acid and their ammonium and alkali metal salts. While these agents do decrease magnesium hydroxide scale deposition to some extent, the extent of decrease is marginal.

U.S. Pat. No. 3,985,671 to Clark, teaches use of a blend of a polyaminoalkylene phosphate and a polyquaternary ammonium chloride as a scale control agent for recirculating water cooling equipment. The combination is shown to be effective in extending the saturation point of calcium carbonate, but no information is given as to its effectiveness in preventing magnesium hydroxide scaling. However, such combination is found upon evaluation to be ineffective in preventing magnesium hydroxide scaling to any desirable extent.

U.S. Pat. No. 3,879,288 to Siegele teaches inhibition of scale deposits of carbonates and sulfates of calcium or alkaline earth metals or iron using a copolymer of a monovinyl compound and a vinyl sulfonate. No teaching is given as to inhibition of scaling due to magnesium hydroxide.

There exists, therefore, the need for a process for inhibiting scaling in evaporative desalination units due to magnesium hydroxide and overcomes deficiencies associated with former procedures. Such a provision would fulfill a long-felt need and constitute a notable advance in the art.

In accordance with the present invention, there is provided a process for inhibiting scaling in evaporative desalination units which comprises adding to the water to be treated, an effective amount of a copolymer derived from about 25 to about 90 mole percent of maleic acid or anhydride and, correspondingly, from about 75 to about 10 mole percent of allyl sulfonic acid, said copolymer having a molecular weight in the range of about 500 to about 25,000.

The process of the present invention by its use of a copolymer of maleic acid or anhydride and allyl sulfonic acid, provides significantly improved inhibition of calcium carbonate and magnesium hydroxide scaling than is obtained by a similar process using a copolymer of fumaric acid and allyl sulfonic acid. This result is highly surprising and totally unexpected in view of the close similarity of the copolymers. When the monomers from which the copolymers are derived polymerize, the unsaturation therein is removed. As a result, the various substituents on the polymer chain obtain free rotation and the two copolymers should be equivalent. However, from the differences in performance in scale inhibition, the two copolymers are for unknown reasons not equivalent. Accordingly, it may be that some memory of the relative positions of the acid groups in the monomers is imparted to the resulting polymers which affects their performance in scale inhibiting applications.

As indicated, the copolymer used in the process of the present invention is derived from about 25 to 90 mole percent of maleic acid or anhydride and correspondingly from about 75 to about 10 mole percent of allyl sulfonic acid, preferably about 40 to 60 mole percent of maleic acid or anhydride. Generally, the polymer will have a molecular weight in the range of about 500 to about 25,000, preferably about 500 to 10,000. Such polymers are readily prepared following conventional procedure, such as described in U.S. Pat. No. 3,879,288 to Siegele.

In carrying out the process of the present invention, an effective amount of the copolymer is added to the water to be processed. The specific amount useful in any given instance will vary widely depending upon the nature of the water being processed, the conditions of operation of the desalination unit, the specific composition of the polymer employed and the like. Conveniently, the copolymer is added as an alkali metal salt, usually sodium salt. Potassium, ammonium or other soluble salts except calcium and magnesium salts may be used and all of the acidic hydrogens need not be replaced, nor of those replaced need the cation be the same. Generally, an effective amount of copolymer will fall in the range of about 0.2 to 2,000 parts per million of the water treated.

The invention is more fully illustrated in the examples which follow wherein all parts and percentages are by weight unless otherwise specified.

Since the evaluation of scale inhibitors in commercial type desalination units involves large quantities of chemical additives, copious quantities of process water, considerable expenditure of power to effect evaporation, and extended time periods of operation, it is desirable to employ a small-size laboratory screening method whereby the suitability of proposed additives can be predicted with accuracy. The test procedures described in the examples which follow have been found to correlate well with commercial operations.

EXAMPLE 1

A synthetic sea water of the following composition was employed:

1000 parts per million $Ca^{+2}$ as $CaCO_3$
6000 parts per million $Mg^{+2}$ as $CaCO_3$
120 parts per million total alkalinity as $CaCO_3$
3200 parts per million $SO_4^{-2}$ as $SO_4^{-2}$
22000 parts per million $Cl-$ as $Cl-$
Sufficient $Na+$ as counterions.

In one sample of the test water, a sufficient quantity of a 1:1 sodium allyl sulfonate:maleic acid copolymer was added to provide 9 parts per million of copolymer. The water was then evaporated at 95° C. to increase the salt concentration two-fold. The inhibition of $CaCO_3$ and $Mg(OH)_2$ scale on a stainless steel heater was determined.

For comparison purposes, the same procedure was followed except that the copolymer was a 1:1 sodium allyl sulfonate:fumaric acid.

Results are given below.

| Copolymer | % CaCO$_3$ Inhibition at 9 ppm copolymer | % Mg(OH)$_2$ Inhibition at 9 ppm copolymer |
|---|---|---|
| Allyl sulfonic acid: | | |
| Maleic acid | 87 | 22 |
| Allyl Sulfonic acid: | | |
| Fumaric acid | 49 | 6 |

EXAMPLE 2

The procedure of Example 1 was followed except that evaporation was carried out at 101° C. and only the inhibition of $Mg(OH)_2$ precipitation was determined at 12 ppm polymer dosage.

Results are given below.

| Copolymer | % Mg(OH)$_2$ Inhibition at 12 ppm copolymer |
|---|---|
| Allyl sulfonic acid: Maleic acid | 48 |
| Allyl sulfonic acid: Fumaric acid | 28 |

EXAMPLE 3

The procedure of Example 1 was again followed except that evaporation was conducted to increase the salt concentration 1.6 fold and the amount of calcium carbonate scale and precipitation inhibition was determined at 0.5 ppm copolymer dosage.

Results are given below.

| Copolymer | % CaCO$_3$ Inhibition (0.5 ppm copolymer) | |
|---|---|---|
| | Scale | Precipitation |
| Allyl sulfonic acid: Maleic acid | 87 | 93 |
| Allyl sulfonic acid: Fumaric acid | 77 | 35 |

We claim:

1. In a process for inhibiting scaling in evaporative desalination units comprising adding to the water to be treated an aliphatic copolymer derived from a monovinyl compound and a vinyl sulfonate, the improvement therein providing improved inhibition of magnesium hydroxide in desalination units operating at temperatures above 90° C. comprising selecting as the copolymer additive one derived from about 50 mole percent of maleic acid or anhydride and, correspondingly, from about 50 mole percent of allyl sulfonic acid, said copolymer having a molecular weight in the range of about 500 to about 10,000, adding the copolymer to the water to be treated in an amount effective to inhibit magnesium hydroxide scaling, heating the water in the desalination unit to temperatures above 90° C. and substantially inhibiting the magnesium hydroxide precipitation therein.

2. The process of claim 1 wherein the amount of copolymer added is from about 0.2 to 2,000 parts per million of the water treated.

* * * * *